No. 656,755. Patented Aug. 28, 1900.
W. W. STEWART.
PIPE CLAMP.
(Application filed May 2, 1900.)
(No Model.)
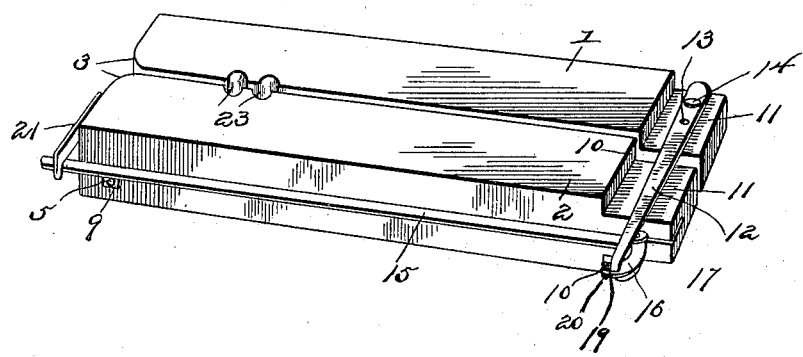
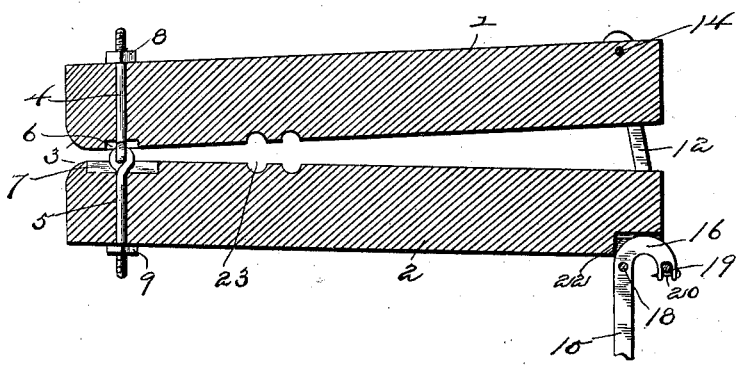
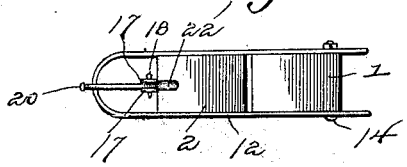
Witnesses
Warren W. Stewart, Inventor.
Attorneys

United States Patent Office.

WARREN WALTER STEWART, OF STERLING COUNTY, TEXAS.

PIPE-CLAMP.

SPECIFICATION forming part of Letters Patent No. 656,755, dated August 28, 1900.

Application filed May 2, 1900. Serial No. 15,270. (No model.)

*To all whom it may concern:*

Be it known that I, WARREN WALTER STEWART, a citizen of the United States, residing in the county of Sterling and State of Texas, have invented a new and useful Pipe-Clamp, of which the following is a specification.

This invention relates to pipe-clamps for holding a pipe while being lowered into or raised from a bored well, and has for its object to provide an improved device of this character which is adjustable to fit any size of pipe and which may be conveniently and firmly clamped upon the latter. It is furthermore designed to provide improved means for drawing together the gripping members of the clamp, so as to obtain varying degrees of pressure upon the pipe and also to provide for locking such means, so as to prevent an accidental separation of the members and a consequent dropping of the pipe.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a pipe-clamp constructed in accordance with the present invention. Fig. 2 is a central longitudinal sectional view thereof. Fig. 3 is an end view of the device.

Corresponding parts in the figures of the drawings are designated by like characters of reference.

Referring to the accompanying drawings, 1 and 2 designate the opposite members of the clamp, which are substantially duplicates and are formed from single blocks of wood in order that the clamp may be light as well as strong, the other parts of the device being of metal. At one end of the clamp the corresponding ends of the members are beveled or rounded inwardly, as at 3, so that these ends may rock over each other in opening or closing the clamp upon the hinged connection of the members formed by the opposite eyebolts 4 and 5, which have their eyes seated in the respective sockets or recesses 6 and 7, formed in the inner faces of the members, and the eyes of the bolts being loosely interlocked. The threaded ends of the shanks of the bolts extend at suitable distances beyond the outer faces of the clamp members and are provided with suitable nuts 8 and 9, whereby the bolts may be adjusted transversely of the members, so as to form an adjustable hinged connection therefor and to vary the distance between the members. The opposite ends of the members are reduced so as to form the shoulders 10 at opposite sides of each member and extending transversely in the same direction as the eyebolts. Embracing the tongues 11, formed by the reduction of the members, is a substantially U-shaped yoke or link 12, the opposite extremities of which are provided with a plurality of corresponding perforations 13 for the reception of a suitable pivot-pin 14, which extends entirely through the adjacent clamp member. The opposite end of the link extends a suitable distance beyond the outer face of the other clamp member and is pivotally connected to a cam-lever 15, whereby the two members may be drawn together upon their hinged ends as a center or fulcrum. The cam-lever is in the shape of a crook having a straight handle and a bowed or arc-shaped end 16, which is received between the sides of the link, the closed end thereof, and the adjacent face of the contiguous clamp member. The cam-lever is fulcrumed at the juncture of the handle and the cam portion thereof between a pair of perforate bearing-ears 17, that are driven into the outer face of the member 2 and upon a suitable pivot-pin 18. The outer extremity of the cam or arcuate end of the lever is bifurcated, as at 19, so as to form a fork, the members of which loosely embrace the rounded transverse end of the link to form a pivotal connection therewith. A suitable pin 20 is passed through the tines or members of the fork and upon the outer side of the link, so as to prevent displacement of the latter from the lever.

In the operation of the device the lever is thrown outwardly, as indicated in Fig. 2 of the drawings, so as to separate the clamp members upon their hinged connection and in order that the pipe may be received between the members, after which the free end of the lever is forced or closed inwardly against the adjacent outer face of the member 2, thereby drawing the free ends of the clamp members together to bind upon the pipe. When the lever has been forced against the adjacent clamp member, a hook or catch 21, which is pivoted to the outer end of the hinged end of the member, is swung over the free end of the lever, which projects beyond the member for this purpose, whereby the lever is held in its locked position to prevent accidental separation of the clamp members. It will now be apparent that the device may be accommodated to different sizes of pipes by adjusting the eyebolts and the link 12 upon its pivotal connection with the member 1.

As indicated in Fig. 2, the outer face of the member 2 is provided with a groove or recess 22 for the reception of the cam end of the lever when the latter is thrown outwardly to open the clamp members. It will also be noted that the eyebolt 5 forms a support for the free end of the lever when the latter is held against the adjacent member.

The inner faces of the clamp members are provided with corresponding grooves 23, which extend transversely across the members and are designed to register and form grooves for the reception of the pipes. These grooves may be of different sizes to accommodate different sizes of pipes and are preferably located adjacent to the hinged ends of the members, so as to obtain the greatest amount of pressure upon the pipes.

What is claimed is—

1. A pipe-clamp, comprising opposite members, which are hingedly connected at one end of the clamp, and have their inner sides provided with corresponding notches for the reception of a pipe, a slotted link loosely embracing the free ends of the members, one end of the link being pivotally connected to one of the members, and the opposite end thereof projecting outwardly beyond the other member, a cam-lever fulcrumed upon the outer side of said other member, and having one end located within and pivotally connected to the projecting end of the link, the lever lying longitudinally at the outer side of the adjacent clamp member in the closed position of the device, and means for locking the free end of the lever against the adjacent clamp member.

2. A pipe-clamp, comprising opposite hingedly-connected members, which have their inner sides provided with corresponding notches for the reception of a pipe, a slotted link loosely embracing the free ends of both members, one end of the link being pivotally connected to one of the members, and the opposite end projecting transversely beyond the other member, a longitudinally-disposed cam-lever, having a bowed end, which is fulcrumed upon the outer side of the said other member, and its cam or bowed end being located within the projecting end of the link and also provided with a notch pivotally receiving the adjacent end portion of the link, and a hook carried by the other member and arranged to hold the free end of the lever against said member.

In testimony that I claim the foregoing as my own I have hereto affixed my signature in the presence of two witnesses.

WARREN WALTER STEWART.

Witnesses:
HALLEY KNIGHT,
HENRY JONES.